UNITED STATES PATENT OFFICE.

BENNO HOMOLKA, OF FRANKFORT-ON-THE-MAIN, AND JOSEF ERBER, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ANTHRACHRYSONE DERIVATIVES.

No. 871,507.    Specification of Letters Patent.    Patented Nov. 19, 1907.

Application filed November 27, 1906. Serial No. 345,413. (Specimens.)

*To all whom it may concern:*

Be it known that we, BENNO HOMOLKA, Ph. D., and JOSEF ERBER, Ph. D., chemists, citizens of the Empire of Germany, and residing at Frankfort-on-the-Main, and Höchst-on-the-Main, Germany, respectively, have invented certain new and useful Improvements in Anthrachrysone Derivatives, of which the following is a specification.

We have found that by combining anthrachrysone with 2 molecular proportions of formaldehyde in alkaline solution a new product may be obtained which when treated with ammonia or with aliphatic or aromatic amins yield a series of peculiar new nitrogenous derivatives of the anthraquinone series. For their production it is, however, not absolutely necessary to isolate the product of the reaction of formaldehyde on anthrachrysone and to treat it with an amin in a separate operation. On the contrary, both reactions may be combined in a single operation by causing formaldehyde to act under certain conditions on anthrachrysone in presence of an amin. Yet a third method is applicable in some cases, namely combining an aliphatic or aromatic amin with formaldehyde and allowing the product to act under suitable conditions on anthrachrysone.

*Example I—Manufacture of the product of reaction of formaldehyde on anthrachrysone.*—110 kilos of anthrachrysone and 65 kilos of caustic soda are dissolved with aid of heat in 1200 liters of water; the solution is filtered if necessary and cooled to from 20–25° C, whereupon 65 kilos of commercial formaldehyde of 40 per cent strength are added. A garnet red difficultly soluble sodium salt begins to separate at once as beautiful crystals, the separation being complete after a few hours. This salt is filtered and washed with cold water, then dissolved in about 8000 liters of hot water and to this solution is added a dilute mineral acid, whereupon the new anthraquinone derivative is separated as an orange-yellow precipitate. It is then filtered, washed with hot water, pressed and dried. The product thus obtained is almost insoluble in water, ligroine, ether, hardly soluble in alcohol and chloroform, very little soluble in acetone; it dissolves in dilute caustic alkali lyes to an orange-yellow solution in concentrated sulfuric acid to a red solution. The reaction takes place according to the following equation:

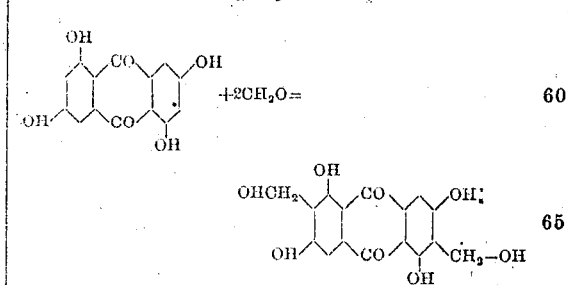

*Example II—Reaction of amins on the product obtained by the reaction of formaldehyde on anthrachrysone.*—In a closed vessel 100 kilos of the product of the reaction of formaldehyde on anthrachrysone, obtained for instance, as described above, are heated to ebullition with a quantity of anilin in excess of the quantity of the reaction-product; dissolution occurs, and a mixture of anilin and water distils. As soon as the formation of water has ceased, the heating is interrupted and the solution allowed to cool, whereupon part of the nitrogenous anthraquinone product separates as crystals, the rest being obtained by distilling the anilin with steam. The product forms orange crystals of basic and acid character. They dissolve in dilute mineral acids to a yellow, in dilute caustic alkalies to an orange solution. The new product is little soluble in the solvents before mentioned; it cannot be fused without decomposing and cannot be sublimed.

Analogous nitrogenous anthraquinone derivatives have been obtained by substituting for the anilin employed in the preceding example the following amins:—ammonia, methylamin, ethylamin, dimethylamin, diethylamin, ortho-toluidin, meta-toluidin, paratoluidin, xilidin, mono-methylanilin, mono-ethylanilin, dimethylanilin, diethylanilin. All compounds thus obtained coincide completely in their chemical and very closely in their physical behavior.

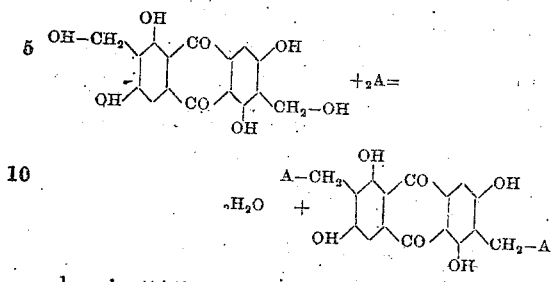

wherein "A" means an amin.

*Example III.—Manufacture of nitrogenous anthraquinone derivatives by the simultaneous action of formaldehyde and amin on anthrachrysone.*—A mixture of 55 kilos of anthraquinone, 350 kilos of dimethylanilin, 1000 kilos of alcohol of 96 per cent strength and 30 kilos of formaldehyde of 40 per cent strength is heated in an apparatus having a reflux condenser on the water-bath until all appears clearly dissolved. The alcohol is then distilled off and the excess of dimethylanilin is expelled with steam. The crude product remaining is dissolved in dilute hydrochloric acid and the solution is filtered and the nitrogenous product precipitated in a purified state by adding sodium carbonate. The product thus obtained is identical with that obtained according to Example II if dimethylanilin is used therein. For the dimethylanilin in this example may be substituted one of the amins mentioned in Example II.

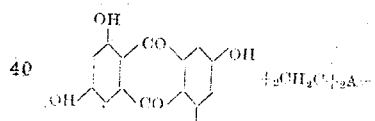

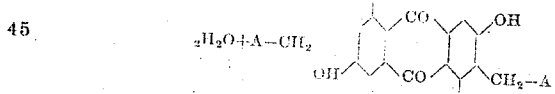

wherein "A" means an amin.

*Example IV—Manufacture of nitrogenous anthraquinone derivatives by the action of a condensation product of formaldehyde with a primary or secondary amin on anthrachrysone.*—500 kilos of ortho-toluidin are heated on the water-bath with 45 kilos of formaldehyde of 40 per cent strength until anhydroformaldehyde-ortho-toluidin is produced. There are then added 80 kilos of anthrachrysone and 500 kilos of alcohol of 96 per cent strength and the whole is heated for some hours in a reflux apparatus on the water-bath. The alcohol is then distilled and the excess of ortho-toluidin expelled with steam. The crude product remaining is dissolved in dilute hydrochloric acid, the solution filtered and the nitrogenous product precipitated in a purified state by adding alkali carbonate. It is identical with the product obtained according to Example II if ortho-toluidin is used. For the ortho-toluidin in this example may be substituted one of the primary or secondary amins mentioned in Example II.

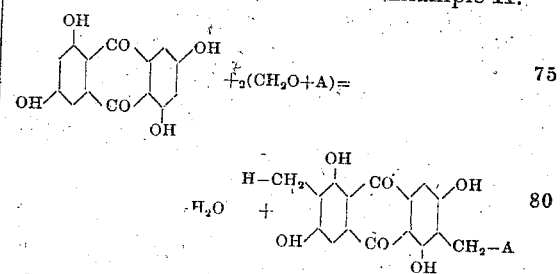

wherein "A" means an amin and $(CH_2O+A)$ represents the compound formed by amin with formaldehyde.

In the Examples II., III. and IV. identical products are obtained when the same amin is used.

The products obtained are insoluble in water, ligroine, ether, hardly soluble in alcohol and chloroform, very little soluble in acetone.

The new products are used in the manufacture of anthracene-dyestuffs.

Although specific examples of the manufacture and of the amins to be used therein have been given above, it is to be understood that the invention is not limited to the examples nor to the proportions mentioned therein, and that for the amins cited others may be substituted either alone or mixed.

Having now described our invention, what we claim is:—

1. The process herein described of making nitrogenous derivatives of anthraquinone, which consists in causing formaldehyde and an amin to act on anthrachrysone, it being immaterial in which order the three bodies are brought together.

2. As new product, a nitrogenous derivative of anthraquinone, obtained by the interaction of anthrachrysone, formaldehyde and an amin, said product being an orange crystalline powder, insoluble in water, hardly soluble in the usual organic solvents; not fusible without decomposition and dissolving in dilute caustic alkalies to an orange, in dilute mineral acids to a yellow solution.

In testimony, that we claim the foregoing as our invention, we have signed our names in presence of two subscribing witnesses.

BENNO HOMOLKA.
JOSEF ERBER.

Witnesses:
 JEAN GRUND,
 CARL GRUND.